J. A. LONG.
ATTACHMENT FOR PLANTERS.
APPLICATION FILED FEB. 15, 1913.
1,068,678.
Patented July 29, 1913.
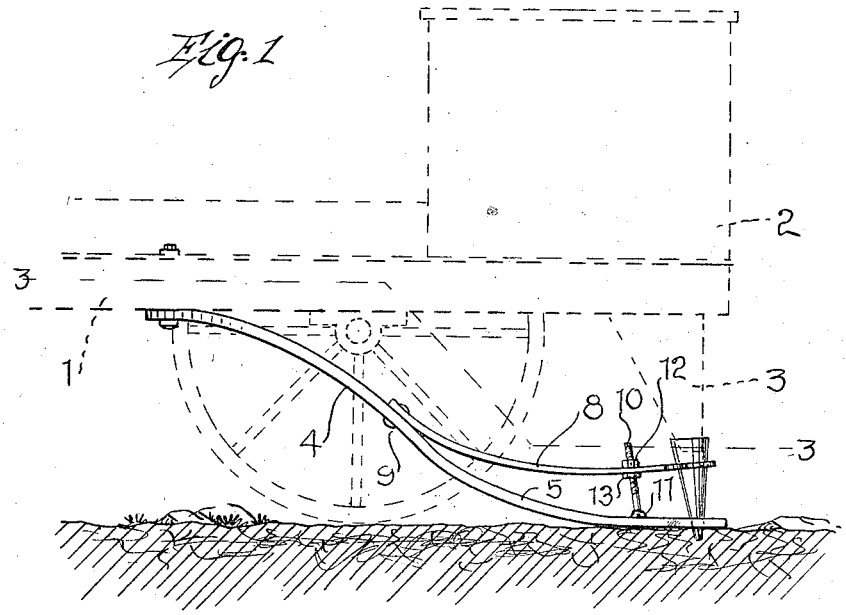
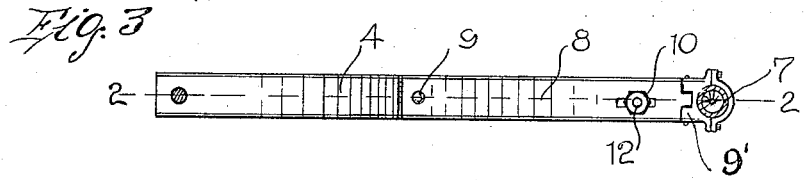
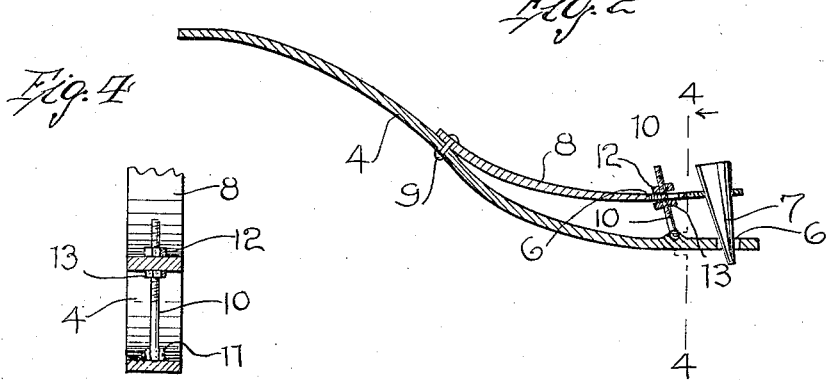
Inventor
J.A. Long
Witnesses
Robert M. Sutphen
A. J. Hind
By Watson E. Coleman
Attorney

UNITED STATES PATENT OFFICE.

JAMES A. LONG, OF LAHOMA, OKLAHOMA.

ATTACHMENT FOR PLANTERS.

1,068,678. Specification of Letters Patent. Patented July 29, 1913.

Application filed February 15, 1913. Serial No. 748,761.

*To all whom it may concern:*

Be it known that I, JAMES A. LONG, a citizen of the United States, residing at Lahoma, in the county of Garfield and State of Oklahoma, have invented certain new and useful Improvements in Attachments for Planters, of which the following is a specification, reference being had to the accompanying drawings.

This invention relates to new and useful improvements in planters and more particularly to an attachment for grain drills and my object is to provide an attachment which will gage the depth of sowing the seed below the surface of the ground.

A further object of the invention resides in providing a device which coöperates with the feed hoes and is capable of adjustment, whereby the seed may be sown at various depths below the surface of the ground and a still further object resides in providing a device which is simple and durable in construction, inexpensive to manufacture and one which will be very efficient and useful in operation.

With these and other objects in view, the invention consists in the novel features of construction, combination and arrangement of parts as will be hereinafter referred to and more particularly pointed out in the specification and claims.

In the accompanying drawing forming a part of this application, Figure 1 is a fragmentary side elevation of a planter showing my attachment applied to use thereon. Fig. 2 is a vertical longitudinal section through the attachment. Fig. 3 is a horizontal section as seen on line 3—3, Fig. 1; and Fig. 4 is a vertical transverse section through the device as seen on line 4—4, Fig. 2, looking in the direction of the arrow.

In describing my invention, I shall refer to the drawing in which similar reference characters designate corresponding parts throughout the several views and in which 1 indicates the frame of a planter of the usual or any preferred type having the hopper 2 mounted thereon and leading from this hopper is the boot 3. Removably secured to the frame 1, forward of the hopper 2, is a downwardly and rearwardly inclined bar 4, said bar being curved intermediate of its ends as shown at 5, to permit the rear end of the bar to rest and travel upon the surface of the ground as the device is propelled. This bar 4 is provided, adjacent its extreme rear end with a slot 6, through which extends the downwardly tapering feed hoe 7, the extreme free end of the latter extending through the slot to a point below the bar 4 and the upper end thereof communicating with the lower end of the boot 3, to receive the contents of the hopper.

The primary object of this invention resides in providing means for the adjustment of this feed hoe 7 with respect to the free end of the bar 4 so as to permit the extreme free end of said hoe to be disposed to a greater or lesser degree below the slot 6 and to this end, a spring metal arm 8 is provided, the one end of which is secured, as shown at 9, to the upper face of the bar 4, at a point forward of the curved or bent portion 5. The opposite end of this spring metal arm 8 is hinged to the feed hoe 7, adjacent its upper end as shown at 9'. The tendency of this spring metal arm 8 is, of course, to force said feed hoe 7 downwardly and in order to retain the same in the required position, a guiding and gaging rod 10 is provided. This rod 10 is hinged at its lower end to the upper face of the bar 5, as shown at 11, at a point just forward of the slot 6 in said bar and the upper end of said rod which is threaded, extends through an enlarged opening in the spring metal arm 8.

Engaged with the threaded end of the rod 10 on opposite sides of the arm 8, are the nuts 12 and 13, which obviously admit of the adjustment and retention of the arm 8 to any desired position with respect to said rod 10. By the adjustment of these nuts 12 and 13 on the rod 10, the spring metal arm 8 may be correspondingly adjusted upwardly or downwardly and thus the lower free or delivering end of the feed hoe 7 may be adjusted to a greater or lesser degree below the bar 5. This adjustment, therefore, admits of the adjustment of the feed hoe so that the seed may be planted at any desired depth below the surface of the ground. It will also be seen that by providing a loose connection between the feed hoe 7 and the one end of the spring metal arm 8, and by hingedly connecting the lower end of the rod 10 to the bar 5, the feed hoe 7 is afforded a slight movement during the operation of the device, thereby permitting said feed hoe to avoid obstructions met in the path thereof.

In the drawing I have shown but a single bar 4, coöperating with a single feed hoe 7 and it will be understood that in practice, as many bars may be provided as there are feed hoes, the same being preferably used in gangs.

From the foregoing it will be seen that I have provided a simple, inexpensive and efficient means for carrying out the objects of the invention and while I have particularly described the elements best adapted to perform the functions set forth, it is obvious that various changes in form, proportion and in the minor details of construction may be resorted to without departing from the spirit or sacrificing any of the principles of the invention.

Having thus described this invention, what I claim is:—

1. In a planter, the combination with a frame, a hopper, and a boot leading from the latter; of a bar carried by the frame and depending therefrom to rest upon the surface of the ground, a feed hoe, leading from said boot and having the lower end thereof disposed through said bar, means to yieldingly support said feed hoe from the bar, and means to adjust said feed hoe so that the free end thereof may be disposed at various depths below said bar.

2. In a planter, the combination with a frame, a hopper carried thereon, and a boot leading from the latter; of a bar secured to the frame and depending therefrom to rest upon the surface of the ground, a feed hoe leading from said boot and having the lower end thereof disposed through said bar to project slightly therebelow, a spring arm carried on said bar and engaged with said feed hoe, the tendency of said arm being to force said feed hoe downwardly and adjusting means in connection with said bar and spring arm to regulate the position of said feed hoe.

3. In a planter, the combination with a frame, a hopper carried thereon, and a boot leading from said hopper; of a bar secured to the frame and depending therefrom to rest upon the surface of the ground, said bar being provided with an opening adjacent its free end, a feed hoe leading from said boot and extending through the opening in said bar to project slightly therebelow, a spring arm secured at one end to said bar and engaged at its other end to said feed hoe, the normal tendency of said spring being to force said feed hoe downwardly, a rod carried on said bar, the free end thereof being threaded and disposed loosely through said spring arm, and nuts engaged with the threaded end of said rod on opposite sides of said spring arm to adjust the latter and correspondingly adjust the position of said feed hoe.

4. In a planter, the combination with a frame, a hopper thereon, and a boot leading from the latter; of a bar carried by the frame and depending therefrom to rest upon the surface of the ground, a feed hoe leading from said boot and having the lower end thereof disposed through said bar, a spring arm carried on said bar, means hingedly securing the upper portion of said feed hoe to the outer free end of said spring arm, the tendency of said spring arm being to force said feed hoe downwardly, and means to adjust said spring arm with respect to said bar and correspondingly adjust the position of the feed hoe with respect to the ground.

In testimony whereof I hereunto affix my signature in the presence of two witnesses.

JAMES A. LONG.

Witnesses:
 E. A. DIXON,
 V. L. CARLILE.

---

Copies of this patent may be obtained for five cents each, by addressing the "Commissioner of Patents, Washington, D. C."